United States Patent
Rud

(10) Patent No.: US 11,076,113 B2
(45) Date of Patent: Jul. 27, 2021

(54) INDUSTRIAL PROCESS DIAGNOSTICS USING INFRARED THERMAL SENSING

(71) Applicant: Rosemount Inc., Chanhassen, MN (US)

(72) Inventor: Jason Harold Rud, Mayer, MN (US)

(73) Assignee: ROSEMOUNT INC., Shakopee, MN (US)

( * ) Notice: Subject to any disclaimer, the term of this patent is extended or adjusted under 35 U.S.C. 154(b) by 729 days.

(21) Appl. No.: 14/037,989

(22) Filed: Sep. 26, 2013

(65) Prior Publication Data

US 2015/0085102 A1 Mar. 26, 2015

(51) Int. Cl.
| | |
|---|---|
| G06T 7/00 | (2017.01) |
| H04N 5/33 | (2006.01) |
| G01M 3/00 | (2006.01) |
| G01M 3/38 | (2006.01) |
| G01N 25/72 | (2006.01) |

(52) U.S. Cl.
CPC ............. H04N 5/33 (2013.01); G01M 3/002 (2013.01); G01M 3/38 (2013.01); G06T 7/001 (2013.01); G06T 7/0008 (2013.01); *G01N 25/72* (2013.01); *G06T 2207/10048* (2013.01); *G06T 2207/30108* (2013.01)

(58) Field of Classification Search
CPC ................... G06T 7/0008; G06T 7/001; G06T 2207/10048; G06T 2207/30108; H04N 5/33
See application file for complete search history.

(56) References Cited

U.S. PATENT DOCUMENTS

| | | | |
|---|---|---|---|
| 3,857,277 A | 12/1974 | Moore | |
| 4,306,457 A | 12/1981 | Fukui | |
| 4,736,250 A | 4/1988 | Blazo | |
| 4,900,161 A * | 2/1990 | Wolf | A47J 27/02 356/43 |
| 4,947,247 A | 8/1990 | Farver | |
| 5,056,046 A | 10/1991 | Mutchler | |
| 5,109,277 A | 4/1992 | James | |
| 5,144,430 A | 9/1992 | Boelart | |

(Continued)

FOREIGN PATENT DOCUMENTS

| | | |
|---|---|---|
| AU | 2002256070 | 5/2006 |
| CN | 1214958 | 4/1999 |

(Continued)

OTHER PUBLICATIONS

Office Action from U.S. Appl. No. 14/224,814, dated Jul. 8, 2015.

(Continued)

*Primary Examiner* — Shawn S An
(74) *Attorney, Agent, or Firm* — Westman, Champlin & Koehler, P.A.

(57) ABSTRACT

A diagnostic field device for identifying a diagnostic condition in an industrial process includes an infrared sensor array having a plurality of infrared sensors arranged to sense infrared emissions from a location in the industrial process. Processing circuitry processes outputs from the plurality of infrared sensors of the sensor array and generates an infrared image. Diagnostic circuitry compares processed outputs from at least two subsections of the infrared image and provides a diagnostic output based upon the comparison.

5 Claims, 7 Drawing Sheets

(56) References Cited

U.S. PATENT DOCUMENTS

| | | | |
|---|---|---|---|
| 5,292,195 A | 3/1994 | Crisman, Jr. |
| 5,638,174 A | 6/1997 | Henderson |
| 5,654,977 A | 8/1997 | Morris |
| 6,000,844 A | 12/1999 | Cramer et al. |
| 6,059,453 A | 5/2000 | Kempf et al. |
| 6,259,810 B1 | 7/2001 | Gill et al. |
| 6,346,704 B2 | 2/2002 | Kenway |
| 6,461,573 B1 | 10/2002 | Yamamoto et al. |
| 6,518,744 B1 | 2/2003 | Tallman |
| 6,573,331 B1 | 6/2003 | Camberlin |
| 6,631,287 B2 | 10/2003 | Newman et al. |
| 7,208,735 B2 | 4/2007 | Sierra et al. |
| 7,248,297 B2 | 7/2007 | Catrysse et al. |
| 7,372,485 B1 | 5/2008 | Bodnar et al. |
| 7,407,323 B2 | 8/2008 | Hutcherson |
| 7,409,867 B2 | 8/2008 | Toy et al. |
| 7,466,240 B2 | 12/2008 | Evans et al. |
| 7,472,215 B1 | 12/2008 | Mok et al. |
| 7,636,114 B2 | 12/2009 | Aoyama |
| 7,680,460 B2 | 3/2010 | Nelson et al. |
| 7,768,425 B2 | 8/2010 | Evans et al. |
| 7,809,379 B2 | 10/2010 | Hedtke et al. |
| 7,852,271 B2 | 12/2010 | Grunig et al. |
| 7,852,383 B2 | 12/2010 | Harada |
| 8,098,302 B2 | 1/2012 | Fakuda et al. |
| 8,108,790 B2 | 1/2012 | Morrison, Jr. et al. |
| 8,121,078 B2 | 2/2012 | Siann et al. |
| 8,191,005 B2 | 5/2012 | Baier et al. |
| 8,208,752 B2 | 6/2012 | Ishii |
| 8,310,541 B2 | 11/2012 | Moore |
| 8,410,946 B2 | 4/2013 | Ansari et al. |
| 8,538,560 B2 | 9/2013 | Brown et al. |
| 8,706,448 B2 | 4/2014 | Orth |
| 8,898,036 B2 | 11/2014 | Sittler et al. |
| 9,019,108 B2 | 4/2015 | Chillar et al. |
| 9,049,239 B2 | 6/2015 | Kenney et al. |
| 9,201,414 B2 | 12/2015 | Kantzes et al. |
| 9,201,419 B2 | 12/2015 | Timsjo et al. |
| 9,247,374 B2 | 1/2016 | Tomimatsu et al. |
| 9,537,699 B2 | 1/2017 | Kenney et al. |
| 9,696,429 B2 | 7/2017 | Turon et al. |
| 10,169,860 B2* | 1/2019 | Spahn | A61B 5/445 |
| 2001/0042834 A1* | 11/2001 | Kenway | B27N 3/00 |
| | | | 250/341.6 |
| 2003/0027949 A1 | 2/2003 | Yamamoto et al. |
| 2004/0041538 A1 | 3/2004 | Sklovsky |
| 2004/0156549 A1 | 8/2004 | Persiantsev |
| 2004/0218099 A1 | 11/2004 | Washington |
| 2004/0245467 A1* | 12/2004 | Lannestedt | H04N 5/33 |
| | | | 250/330 |
| 2005/0008072 A1 | 1/2005 | Angerer |
| 2005/0012817 A1* | 1/2005 | Hampapur | H04N 7/185 |
| | | | 348/143 |
| 2005/0025368 A1 | 2/2005 | Glukhovsky |
| 2005/0111696 A1 | 5/2005 | Baer |
| 2005/0164684 A1 | 7/2005 | Chen et al. |
| 2005/0220331 A1 | 10/2005 | Kychakoff et al. |
| 2006/0026971 A1 | 2/2006 | Sharpe |
| 2006/0092153 A1 | 5/2006 | Chu et al. |
| 2006/0148410 A1 | 7/2006 | Nelson |
| 2006/0278827 A1* | 12/2006 | Sierra | G01J 1/04 |
| | | | 250/338.1 |
| 2007/0019077 A1 | 1/2007 | Park |
| 2007/0052804 A1 | 3/2007 | Money et al. |
| 2007/0073439 A1 | 3/2007 | Habibi et al. |
| 2007/0125949 A1* | 6/2007 | Murata | H04N 5/33 |
| | | | 250/338.1 |
| 2008/0165195 A1 | 7/2008 | Rosenberg |
| 2008/0210872 A1* | 9/2008 | Grimberg | G01J 5/0834 |
| | | | 250/339.04 |
| 2008/0255637 A1* | 10/2008 | Oishi | A61F 7/00 |
| | | | 607/85 |
| 2008/0278145 A1 | 11/2008 | Wenger |
| 2009/0078047 A1 | 3/2009 | Dam |
| 2009/0249405 A1 | 10/2009 | Karaoguz et al. |
| 2009/0285259 A1 | 11/2009 | Allen et al. |
| 2010/0013918 A1 | 1/2010 | Ta ' Eed |
| 2010/0220180 A1 | 9/2010 | Lee et al. |
| 2011/0230942 A1* | 9/2011 | Herman | A61B 5/0059 |
| | | | 607/96 |
| 2011/0317066 A1 | 12/2011 | Capman et al. |
| 2012/0025081 A1 | 2/2012 | Rapp et al. |
| 2012/0041582 A1 | 2/2012 | Wallace |
| 2012/0109342 A1 | 5/2012 | Braun et al. |
| 2012/0157009 A1 | 6/2012 | Hollander |
| 2012/0161958 A1 | 6/2012 | Turon et al. |
| 2013/0009472 A1 | 1/2013 | Orth |
| 2013/0085688 A1 | 4/2013 | Miller et al. |
| 2013/0099922 A1 | 4/2013 | Lohbihler |
| 2013/0120561 A1 | 5/2013 | Heintze |
| 2013/0163812 A1 | 6/2013 | Mukasa |
| 2013/0176418 A1 | 7/2013 | Pandey et al. |
| 2013/0222608 A1 | 8/2013 | Baer |
| 2013/0250125 A1* | 9/2013 | Garrow | H04N 5/3651 |
| | | | 348/164 |
| 2013/0294478 A1* | 11/2013 | Puroll | G01N 25/72 |
| | | | 374/45 |
| 2014/0003465 A1 | 1/2014 | Elke |
| 2014/0128118 A1 | 5/2014 | Tomimatsu et al. |
| 2014/0375820 A1 | 12/2014 | Priyantha et al. |
| 2015/0116482 A1 | 4/2015 | Bronmark et al. |
| 2015/0130927 A1 | 5/2015 | Luxen et al. |
| 2016/0091370 A1 | 3/2016 | Schnaare |

FOREIGN PATENT DOCUMENTS

| | | |
|---|---|---|
| CN | 2694128 | 4/2005 |
| CN | 2002256070 | 5/2006 |
| CN | 1882078 | 12/2006 |
| CN | 101014091 | 8/2007 |
| CN | 101019419 | 8/2007 |
| CN | 101046375 | 10/2007 |
| CN | 101277383 | 10/2008 |
| CN | 101460971 | 6/2009 |
| CN | 201322868 | 10/2009 |
| CN | 101600046 | 12/2009 |
| CN | 101647216 | 2/2010 |
| CN | 101681161 | 3/2010 |
| CN | 101685295 | 3/2010 |
| CN | 1012483618 | 5/2012 |
| CN | 102830669 | 12/2012 |
| CN | 102999022 | 3/2013 |
| CN | 103380446 | 10/2013 |
| CN | 103947170 | 7/2014 |
| CN | 204350309 | 5/2015 |
| EP | 2 130 187 | 4/2017 |
| JP | 53-86111 | 7/1978 |
| JP | S58-090882 | 5/1983 |
| JP | 61-136340 | 6/1986 |
| JP | 62-179647 | 8/1987 |
| JP | 64-73880 | 3/1989 |
| JP | H07-325900 | 12/1995 |
| JP | H09-265316 | 10/1997 |
| JP | 52-140779 | 11/1997 |
| JP | 10-47312 | 2/1998 |
| JP | H10-294933 | 11/1998 |
| JP | H1123350 A | 1/1999 |
| JP | H11-75176 | 3/1999 |
| JP | 11-189603 | 7/1999 |
| JP | 11-218442 | 8/1999 |
| JP | 2000-310577 | 11/2000 |
| JP | 2001-84031 | 3/2001 |
| JP | 2001-221666 | 8/2001 |
| JP | 2001-238198 | 8/2001 |
| JP | 2001221666 A | 8/2001 |
| JP | 2001-256475 | 9/2001 |
| JP | 2002-300569 | 10/2002 |
| JP | 2004-288092 | 10/2004 |
| JP | 2005-134357 | 5/2005 |
| JP | 2006-031418 | 2/2006 |
| JP | 2007-108836 | 4/2007 |
| JP | 2008-527493 | 7/2008 |
| JP | 2008-257513 | 10/2008 |

(56) References Cited

FOREIGN PATENT DOCUMENTS

| | | |
|---|---|---|
| JP | 2009-210042 | 9/2009 |
| JP | 2012-175631 | 9/2010 |
| JP | 2010-536092 | 11/2010 |
| JP | 2010-283444 | 12/2010 |
| JP | 2011-185926 | 9/2011 |
| JP | 2011-209033 | 10/2011 |
| JP | 2012-37519 | 2/2012 |
| JP | 2012-58093 | 3/2012 |
| JP | 2013-009079 | 1/2013 |
| JP | 2013-533570 | 8/2013 |
| JP | 2014-523033 | 9/2014 |
| RU | 2 372 667 | 11/2009 |
| RU | 2419926 | 5/2011 |
| TW | I220364 | 8/2004 |
| WO | 11-23350 | 1/1999 |
| WO | WO 2004/011935 | 2/2004 |
| WO | 2006081154 | 9/2007 |
| WO | WO 2007/139123 | 12/2007 |
| WO | WO 2008/136752 | 11/2008 |
| WO | 2009074708 A1 | 6/2009 |
| WO | WO 2009/074708 | 6/2009 |
| WO | WO 2011/004020 | 1/2011 |
| WO | WO 2011/137264 | 11/2011 |
| WO | WO 2013/006307 | 1/2013 |
| WO | WO 2013/009715 | 1/2013 |

OTHER PUBLICATIONS

Notification of Transmittal of the International Search Report and the Written Opinion of the International Searching Authority, PCT/US2015/011958, dated May 18, 2015.
"Integrated Wireless Gas Detection Solution", www.gassecure.com, Jun. 2014, 2 pgs.
"GS01 Wireless Gas Detector", www.gassecure.com, Jun. 2014, 2 pgs.
Office Action from U.S. Appl. No. 14/224,858, dated Oct. 2, 2015.
Notification of Transmittal of the International Search Report and the Written Opinion of the International Searching Authority, PCT/US2015/040310, dated Nov. 11, 2015.
Final Office Action from U.S. Appl. No. 14/224,814, dated Feb. 1, 2016.
Office Action from U.S. Appl. No. 14/224,858, dated Feb. 5, 2016.
Notification of Transmittal of the International Search Report and the Written Opinion of the International Searching Authority, PCT/US2014/051628, dated Apr. 13, 2015.
First Correct Notification for Chinese Patent Application No. 201420426405.7, dated Oct. 31, 2014, 4 pages.
Notification of Transmittal of the International Search Report and the Written Opinion of the International Searching Authority, PCT/US2014/051625, dated Oct. 23, 2014.
DF-TV7-T, Multi-Spectrum 3IR Flame Detector, Groveley Detection Ltd., 2 pgs. no date.
DF-TV7-V, Combined UV/2IR Flame Detector, Groveley Detection Ltd., 2 pgs. no date.
FDS301, Visual Flame Detector FDS301, Groveley Detection Ltd., 2 pgs. no date.
Hardesty, Larry. (MIT News Office). MIT News "Researchers amplify variations in video, making the invisible visible," dated Jun. 22, 2012, 3 pgs. Found at http://web.mit.edu/newsoffice/2012/amplifying-invisible-video-0622.html.
Notification of Transmittal of the International Search Report and the Written Opinion of the International Searching Authority, PCT/US2014/069968, dated Mar. 19, 2015.
Invitation to Pay Additional Fees, PCT/US2014/051628, dated Nov. 25, 2014.
Office Action from Chinese Patent Application No. 201320868039.6, dated May 19, 2014.
Notification of Transmittal of the International Search Report and the Written Opinion of the International Searching Authority, PCT/US2014/051432, dated Jan. 12, 2015.
Communication from European Patent Application No. 14761468.9, dated May 4, 2016.
Office Action from U.S. Appl. No. 14/224,814, dated Jun. 15, 2016.
Office Action from U.S. Appl. No. 14/038,090, dated Jun. 28, 2016.
Office Action from European Application Serial No. 14761467.1, dated May 4, 2016.
Office Action from Russian Application Serial No. 2016116020, dated May 31, 2016.
Office Action from European Application Serial No. 14783924.5, dated Jun. 3, 2016.
Examination Report from Australian Application Serial No. 2014328576, dated Jul. 21, 2016.
Office Action from Chinese Patent Application No. 201410061865.9, dated Jun. 9, 2017.
Third Examination Report from Australian Patent Application No. 2014328576, dated Jun. 29, 2017.
Office Action from U.S. Appl. No. 14/224,858, dated Jun. 12, 2015.
Office Action from Chinese Application Serial No. 201310737591.6, dated Oct. 17, 2016.
Office Action from Japanese Patent Application No. 2016-516983, dated Mar. 8, 2017.
Office Action from Canadian Patent Application No. 2,923,159 dated May 19, 2017.
Office Action from Chinese Patent Application No. 201410366348.6, dated Feb. 24, 2017.
Communication from European Patent Application No. 15744804.4, dated May 9, 2017.
Office Action from Chinese Patent Application No. 201310737591.6, dated Jun. 1, 2017.
Examination Report No. 2 from Australian Patent Application No. 2014328666, dated Jun. 16, 2017.
"ADNS-5090 Low Power Optical Mouse Sensor Data Sheet", Avago Technologies, dated Apr. 25, 2012.
Office Action from Chinese Patent Application No. 201410024656.7, dated Jun. 8, 2017.
Office Action from Japanese Patent Application No. 2016-517425, dated Jun. 6, 2017.
Office Action from Australian Patent Application No. 2014328576, dated Feb. 24, 2017.
Office Action from Canadian Patent Application No. 2,923,159, dated Mar. 7, 2017.
Office Action from Japanese Patent Application No. 2016-516988, dated Mar. 24, 2017.
Examination Report from Australian Application Serial No. 2014328666, dated Oct. 11, 2016.
Office Action from Chinese Application Serial No. 201410024656.7, dated Oct. 9, 2016.
Office Action from Canadian Application Serial No. 2,923,153, dated Jan. 16, 2017.
Office Action from Chinese Patent Application No. 201410061865.9 dated Oct. 28, 2016.
Communication from European Patent Application No. 15706956.8, dated Nov. 7, 2016.
Office Action from Canadian Application Serial No. 2,923,156, dated Feb. 2, 2017.
Office Action from U.S. Appl. No. 14/449,719, dated Mar. 23, 2017.
Office Action (including Search Report) from Russian Application Serial No. 2016116020, dated Feb. 10, 2017.
Office Action from Canadian Patent Application No. 2,923,159 dated May 19, 2017, 3 pages.
Office Action from U.S. Appl. No. 14/037,989, dated Jun. 3, 2016, 11 pages.
Office Action from U.S. Appl. No. 14/224,858, dated Jun. 12, 2015, 13 pages.
Office Action from Japanese Patent Application No. 2016-516983, dated Mar. 8, 2017, 4 pages.
Office Action from Chinese Patent Application No. 201410366348.6, dated Feb. 24, 2017, 13 pages.
Communication from European Patent Application No. 15744804.4 dated May 9, 2017, 2 pages.
Office Action from U.S. Appl. No. 14/038,090, dated Jun. 28, 2017.
Office Action from Canadian Patent Application No. 2,943,542, dated Jul. 31, 2017.

(56) References Cited

OTHER PUBLICATIONS

Office Action from Russian Patent Application No. 2016116017, dated Jun. 8, 2017.
"Heat Transfer Performance for Batch Oscillatory Flow Mixing", by Stephens et al., Elsevier 2002.
Office Action from U.S. Appl. No. 14/038,185, dated Oct. 24, 2016.
Office Action from U.S. Appl. No. 14/038,185, dated May 17, 2017.
Office Action from Russian Patent Application No. 2016116039, dated Jul. 13, 2017.
Third Examination Report from Australian Patent Application No. 2014328666, dated Oct. 10, 2017.
Office Action from Japanese Patent Application No. 2016-558794, dated Oct. 24, 2017.
Final Rejection from Japanese Patent Application No. 2016-516988, dated Nov. 8, 2017, 11 pages.
Examination Report from Australian Patent Application No. 2015324515 dated Sep. 4, 2017.
Office Action from Chinese Patent Application No. 201410366848.6, dated Nov. 6, 2017.
Office Action from U.S. Appl. No. 14/499,719, dated Oct. 6, 2017.
Office Action from Canadian Patent Application No. 2,923,156, dated Nov. 30, 2017.
Office Action from Canadian Patent Application No. 2,957,246, dated Dec. 8, 2017.
Final Office Action from U.S. Appl. No. 14/038,090, dated Jan. 24, 2018, 33 pages.
Office Action from U.S. Appl. No. 14/038,185, dated Nov. 2, 2017.
Office Action from Chinese Patent Application No. 201310737591.6, dated Nov. 29, 2017.
Office Action from Japanese Patent Application No. 2016-516983, dated Dec. 6, 2017.
Office Action from Canadian Patent Application No. 2,923,153, dated Dec. 13, 2017.
Office Action from Chinese Patent Application No. 201410831781.9, dated Nov. 28, 2017, 13 pages.
Office Action from Chinese Patent Application No. 201410024656.7 dated Dec. 28, 2017.
Office Action from Japanese Patent Application No. 2016-517425, dated Jan. 9, 2018.
Office Action from Japanese Patent Application No. 2017-516333, dated Mar. 20, 2018.
Office Action from European Patent Application No. 14783924.5, dated Mar. 16, 2018.
Office Action from Russian Patent Application No. 2017114674, dated May 31, 2018.
Office Action from Canadian Patent Application No. 2,957,246, dated Jul. 30, 2018.
Office Action from Japanese Patent Application No. 2017-516333, dated Jul. 31, 2018.
Office Action from Chinese Patent Application No. 201310737591.6, dated May 24, 2018.
Office Action from U.S. Appl. No. 14/038,090, dated Aug. 9, 2018.
Office Action from Canadian Patent Application No. 2,923,156, dated Jun. 19, 2018.
Office Action from U.S. Appl. No. 14/038,185, dated Oct. 19, 2018.
Office Action from Chinese Patent Application No. 201410024656.7, dated Sep. 20, 2018.
Office Action from Chinese Patent Application No. 201410831781.9, dated Aug. 9, 2018.
Office Action from U.S. Appl. No. 14/499,719, dated Jul. 9, 2018.
Office Action from Canadian Patent Application No. 2,923,153, dated Aug. 24, 2018.
Office Action from Russian Patent Application No. 2017114674, dated Oct. 26, 2018.
Office Action from U.S. Appl. No. 14/038,185, dated Apr. 5, 2018.
Final Office Action from U.S. Appl. No. 14/038,090, dated Feb. 7, 2019.
Trial Decision from Japanese Patent Application No. 2016-516988 (Appeal No. 2017-18657), dated Oct. 31, 2018.
Examination Report from Indian Patent Application No. 201627005256, dated Dec. 22, 2018.
Communication from European Patent Application No. 15744804.4, dated Jan. 31, 2019.
Office Action from Chinese Patent Application No. 201410831781.9, dated Mar. 4, 2019.
Office Action from Japanese Patent Application No. 2017-516333, dated Dec. 18, 2018.
Office Action from U.S. Appl. No. 14/038,185, dated May 16, 2019.
Office Action from Canadian Patent Application No. 2,923,156, dated Mar. 21, 2019.
Office Action from Canadian Patent Application No. 2,923,153 dated Mar. 21, 2019.
Examination Report from Indian Patent Application No. 201627004690, dated Mar. 27, 2019.
Office Action from U.S. Appl. No. 14/038,090, dated Jun. 28, 2019.
Office Action from Japanese Patent Application No. 2018-004260, dated May 28, 2019.
Communication from European Patent Application No. 14761467.1, dated May 29, 2019.
Office Action from Chinese Patent Application No. 201410024656.7, dated Jun. 20, 2019.
Office Action from U.S. Appl. No. 14/499,719, dated Aug. 21, 2019.
Communication from European Patent Application No. 14761468.9, dated Nov. 7, 2019.
Office Action from Australian Patent Application No. 2018222951, dated Jul. 12, 2019.
Office Action from U.S. Appl. No. 14/038,185, dated Oct. 4, 2019.
Office Action from Chinese Patent Application No. 201410831781.9, dated Sep. 18, 2019.
Appeal Decision from Japanese Patent Application No. 2016-517425, dated Oct. 29, 2019.
Examination Report from Indian Patent Application No. 201627004614, dated Dec. 12, 2019.
Communication from European Patent Application No. 14761467.1, dated Dec. 5, 2019.
Communication from European Patent Application No. 14783924.5, dated Jan. 2, 2020.
Office Action from U.S. Appl. No. 14/499,719, dated Mar. 2, 2020.
Examination Report No. 2 from Australian Patent Application No. 2018222951, dated Mar. 4, 2020.
Office Action from U.S. Appl. No. 14/038,185, dated Apr. 16, 2020.
Examination Report from Indian Patent Application No. 201727002213, dated Apr. 30, 2020.
Office Action from Chinese Patent Application No. 201410831781.9, dated Jun. 22, 2020.
Communication from European Patent Application No. 14761468.9, dated Jul. 29, 2020.

* cited by examiner

INDUSTRIAL PROCESS DIAGNOSTICS USING INFRARED THERMAL SENSING

BACKGROUND

The present invention relates to diagnostics of process control and monitoring systems for use with industrial processes. More specifically, the present invention relates to diagnostics which are based upon thermal sensing in industrial processes.

Industrial processes are used in the manufacture and movement of various process fluids. In such installations, piping is used to convey process fluid between various locations such as containers or other vessels. The various process components which carry the process fluid are connected using joints or other means.

The joints and other connections or components within an industrial process that carry process fluid may tend to degrade and eventually leak process fluids including gases. Such leaks may result in a temperature gradient in the process which can be identified by an operator physically walking through an industrial plant carrying a handheld thermal imaging camera. The operator must manually interpret the image information to determine if a leak is present. This is time consuming and does not provide continuous monitoring of critical points within the process.

SUMMARY

A diagnostic field device for identifying a diagnostic condition in an industrial process includes an infrared sensor array having a plurality of infrared sensors arranged to sense infrared emissions from a location in the industrial process. Processing circuitry processes outputs from the plurality of infrared sensors of the sensor array and generates an infrared image. Diagnostic circuitry compares processed outputs from at least two subsections of the infrared image and provides a diagnostic output based upon the comparison.

DETAILED DESCRIPTION OF ILLUSTRATIVE EMBODIMENTS

Diagnostics are provided which can identify anomalies in an industrial process based upon thermal imaging rather than employing thermal sensors which physically couple to components of the industrial process. Further, the technique does not require an operator to physically inspect the process. In one example embodiment, an infrared array is used to obtain a thermal image of the process. Diagnostic circuitry performs diagnostics by monitoring a relationship between at least two subsections of the thermal image. Variations in this relationship can be correlated to thermal diagnostic conditions in the industrial process such as leaking gases, overheating motors or relays, fires, escaping coolant, etc. The diagnostic process can be performed without requiring an employee to enter the process environment and operate a handheld thermal imaging camera.

Figure 1:
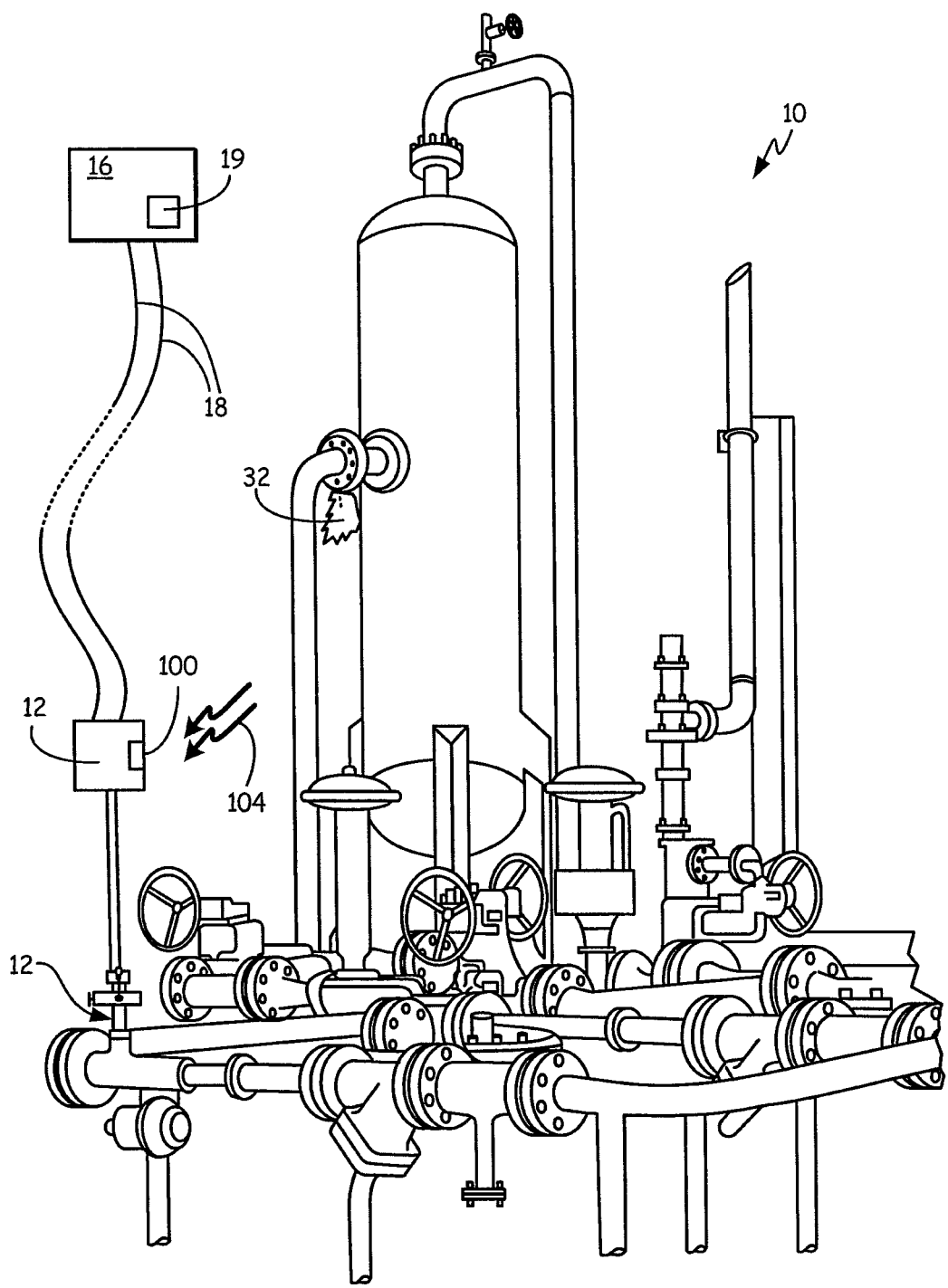
FIG. 1 is a simplified diagram showing an industrial process including a diagnostic field device.

FIG. 1 is a simplified diagram showing an industrial process 10 which includes a process diagnostic device 12 illustrating one embodiment of the invention. The device 12 can be any type of process device such as a stand-alone device, or process variable transmitter or controller. Device 12 couples to a remote location such as process control room 16 over a two-wire process control loop 18. For example, loop 18 can comprise a 4-20 mA current loop that can also be used to power devices connected to the loop 18. Data can be carried on loop 18 in accordance with any appropriate protocol, for example, an analog current level which varies between 4 and 20 mA, the HART® communication protocol in which digital information is modulated upon a 4-20 mA current, a FieldBus or Profibus communication protocol, etc., including wireless communication techniques. One example of wireless communication technique is the Wireless HART® communication protocol in accordance with the IEC 62591. Standard Ethernet, fiberoptic connections, or other communication channels may also be used to implement loop 18. Control room 16 includes an optional display 19 discussed below in more detail.

As illustrated in FIG. 1, process diagnostic device 12 includes an infrared detector 100 configured to receive infrared radiation 104, for example, from the location of a gas leak 32. Leak 32 is illustrated as originating at a joint or connection in the process piping. Detector 100 may comprise an infrared sensor array. As described below in more detail, process diagnostic device 12 is capable of detecting leak 32 by monitoring infrared radiation 104.

Figure 2:
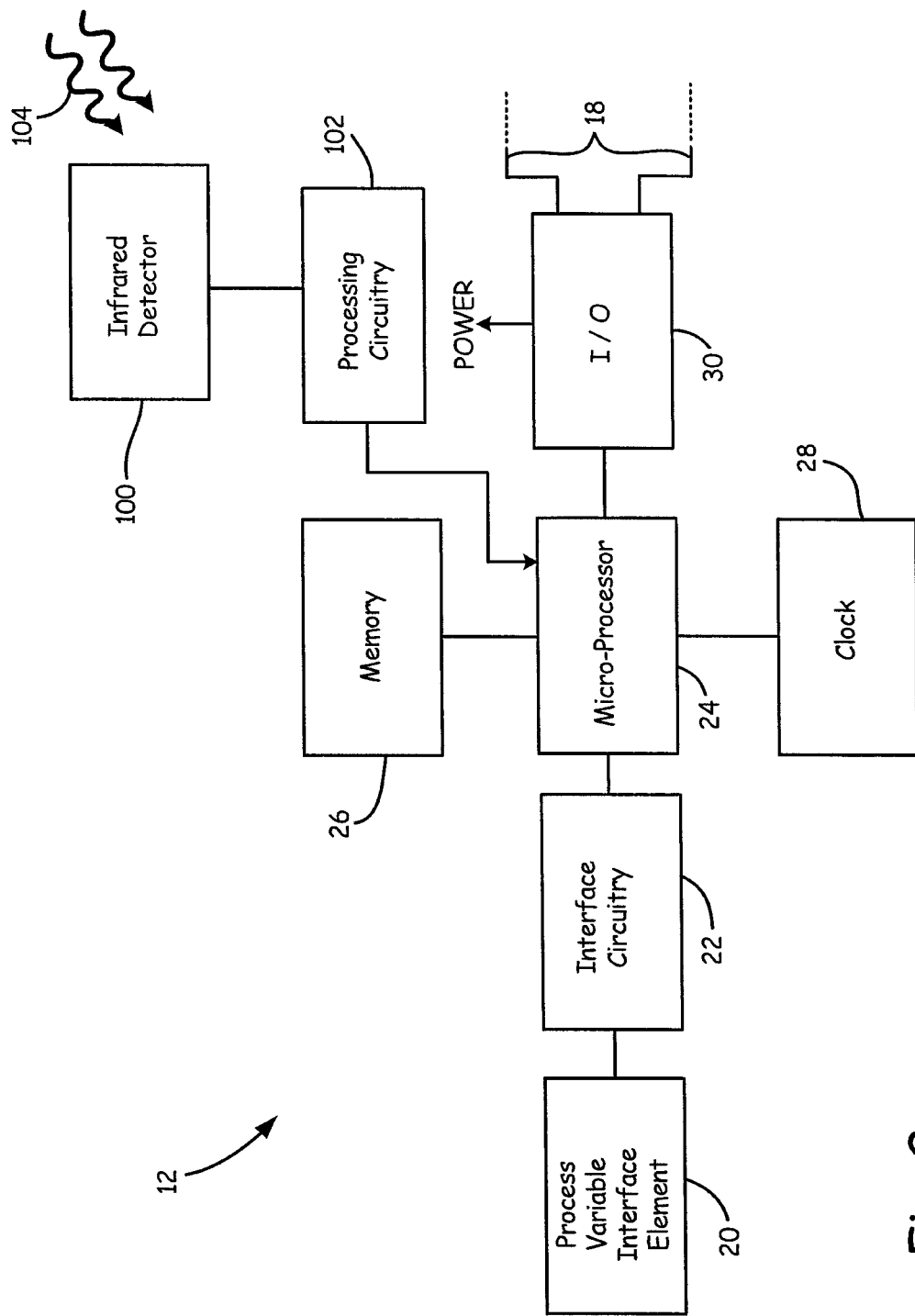
FIG. 2 is a simplified block diagram showing a process field device from FIG. 1.

FIG. 2 is a simplified block diagram of process diagnostic device 12 according to an embodiment of the invention. Process diagnostic device 12 can be configured as a stand-alone diagnostic device, or as a process variable transmitter or controller. Device 12 includes a microprocessor 24 which operates in accordance with instructions stored in memory 26 at a rate determined by clock 28. Communication circuitry (I/O) 30 is used for communicating on the process control loop 18. In some embodiments, I/O circuitry 30 also provides power to device 12.

FIG. 2 also illustrates infrared detector 100 coupled to processing circuitry 102. Infrared detector 100 is configured to receive infrared radiation 104 and output a thermal image. Processing circuitry 102 provides optional pre-processing of a detected infrared image prior to providing the image to microprocessor 24. Note that FIG. 2 also illustrates an optional process variable interface element 20 and interface circuitry 22. The interface element 20 may be a process variable sensor or controller.

As illustrated in FIGS. 1 and 2, an infrared detector 100 is shown. Detector 100 is arranged to receive infrared radiation 104 from the industrial process 10 illustrated in FIG. 1. The detected infrared radiation forms a thermal or infrared image of the industrial process. The image is formed by a plurality of subsections which correspond to different regions in the process. Infrared detector 100 is preferably directional and, as explained below in more detail, includes a plurality of individual infrared sensors.

These sensors may be individual discrete elements or may be fabricated in a single device. The output from infrared detector 100 is provided to processing circuitry 102 illustrated in FIG. 2 which provides a processed output to the microprocessor 24. For example, processing circuitry 102 can include amplification circuitry, noise reduction circuitry, an analog to digital converter, comparison circuitry, etc. The output from processing circuitry 102 is provided to microprocessor 24 in a digital format.

Figure 3:
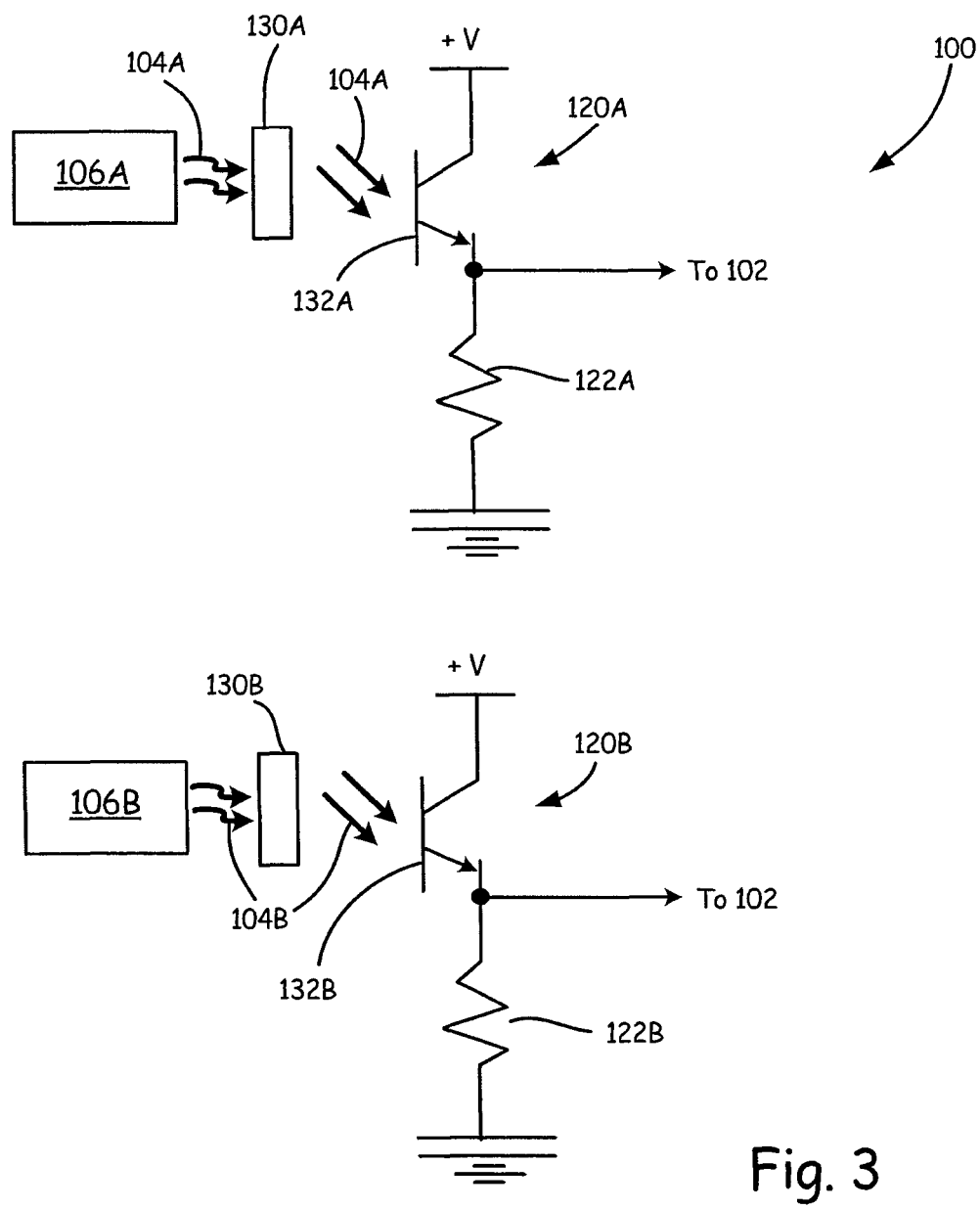
FIG. 3 is a simplified schematic diagram illustrating one example configuration of an infrared for use with the field device shown in FIG. 2.

In one example configuration, infrared detector 100 is formed of at least two individual infrared sensors 120A and 120B as illustrated in FIG. 3. In FIG. 3, the infrared detector 100 is configured to form an infrared (or thermal) image which comprises only two pixels formed by infrared sensors 120A and 120B. Each of these two pixels corresponds to a subsection of the infrared image and sense infrared radiation from two locations 106A, 106B within the industrial process 10. Infrared sensors 120A and 120B are arranged to receive infrared radiation 104A, B which passes through an optional infrared lens, filter, or other element 130A, B, respectively. In the configuration shown in FIG. 3, sensors 120A and 120B are formed using infrared sensitive transistors 132A and 132B, respectively, which couple to electrical ground through resistors 122A and 122B. However, the invention can be implemented using any type of thermal sensor including thermopiles, photo diodes or others. Transistors 132A and 132B are coupled to a positive power supply voltage and provide an output to processing circuitry 102 shown in FIG. 2 upon receipt of sufficient infrared radiation 104A,B to turn transistors 132A,132B "on." Although FIG. 3 illustrates the infrared sensor as implemented using a transistor, any appropriate type of infrared sensing technology may be employed. Examples include infrared sensitive diodes, charge coupled devices (CCDs), complimentary metal-oxide-semiconductor (CMOS) devices or others. In the embodiment of FIG. 3, two individual sensors are shown. However, the sensors may be formed in a one or two-dimensional array or matrix. Thus, a captured thermal image can be obtained using just two individual infrared sensors with each sensor corresponding to a subsection or region within the image, or can be formed using a larger number of individual sensors to form a larger matrix or array.

Figure 4:
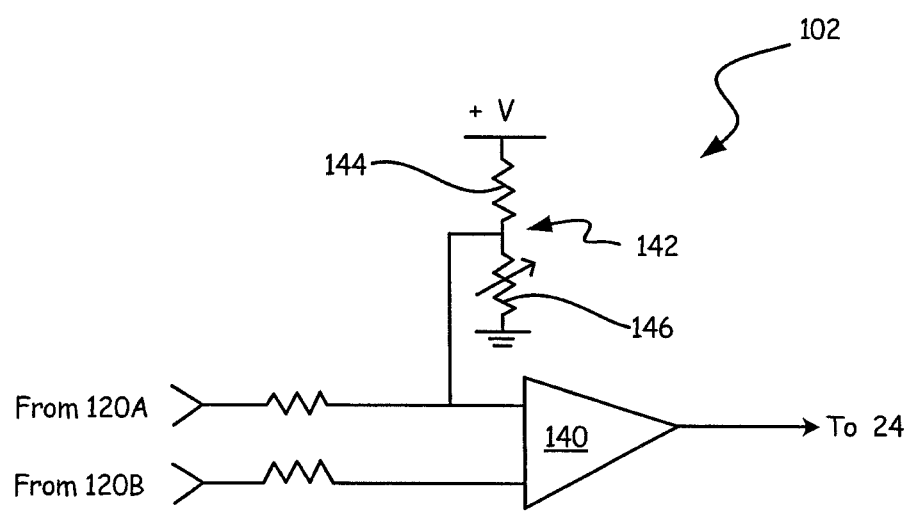
FIG. 4 is a simplified schematic diagram illustrating one example configuration of processing circuitry for use with the field device shown in FIG. 2.

FIG. 4 shows a schematic diagram of one example configuration of processing circuitry 102. In the embodiment shown in FIG. 4, processing circuitry 102 is formed using a comparator 140 which receives the outputs from infrared detectors 120A and 120B. In the configuration shown in FIG. 4, if the outputs from detectors 120A and 120B are sufficiently different, comparator 140 can be configured to provide a high logic level output to microprocessor 24. If desired, optional offset circuitry 142 can be implemented. In the illustrated embodiment, circuitry 142 is implemented using resistor 144 and variable resistor 146.

In operation, infrared sensors 120A and 120B are directed (aimed) to receive infrared radiation 104A and 104B from different locations 106A and 106B. The infrared radiation from these two locations 106A,B are then compared using comparator 140. In this embodiment, if the amount of infrared radiation from the two locations 106A,106B differs by more than a predetermined amount, an output is provided to microprocessor 24. Based upon this output, microprocessor 24 and/or processing circuitry 102 operates as diagnostic circuitry and identifies a diagnostic condition in the industrial process. In one aspect, by comparing the infrared output from two locations 106A,106B, the diagnostic circuitry reduces the likelihood of a false detection of a diagnostic condition, for example, due to changing ambient conditions. In one example configuration, the memory 26 illustrated in FIG. 2 stores a nominal relationship between the infrared radiation 104A, 104B from the at least two locations 106A, 106B. This nominal relationship can be a linear relationship in which a comparison can be performed between the infrared outputs and, if the difference between the two infrared outputs exceeds a threshold stored in memory 26, a diagnostic condition output can be triggered by microprocessor 24. However, more complex nominal relationships may be employed including non-linear relationships, as well as relationships which include the infrared output from more than two locations. Further still, the nominal relationship may be based upon other conditions in the process such as process variables of the process which are measured, process commands which are received from process variable loop 18, etc. Thus, in some instances, it may be expected that during some periods the thermal variation between locations 106A,B will change in a particular manner whereas during other periods of process operation, such a variation would indicate a diagnostic condition.

The particular locations 106A,B can be selected as desired. For example, these may be active components in the process such as valves, solenoid relays, electrical junctions, motors, etc. Similarly, other elements which may be monitored include joints, piping, tanks or other vessels, areas in which combustion occurs, areas in which exhaust is expelled such as smoke stacks, etc. The particular nominal relationship used for the comparison may change with time or other conditions and is not necessarily a static relationship. The diagnostic condition may be any condition including an unknown condition but may also be an indication that a component is overheating, an unwanted combustion is occurring, steam, gas or other process fluid is leaking from a location, an electrical short circuit has occurred, a loose electrical connection or other high resistance situation has occurred, etc.

Figure 5:
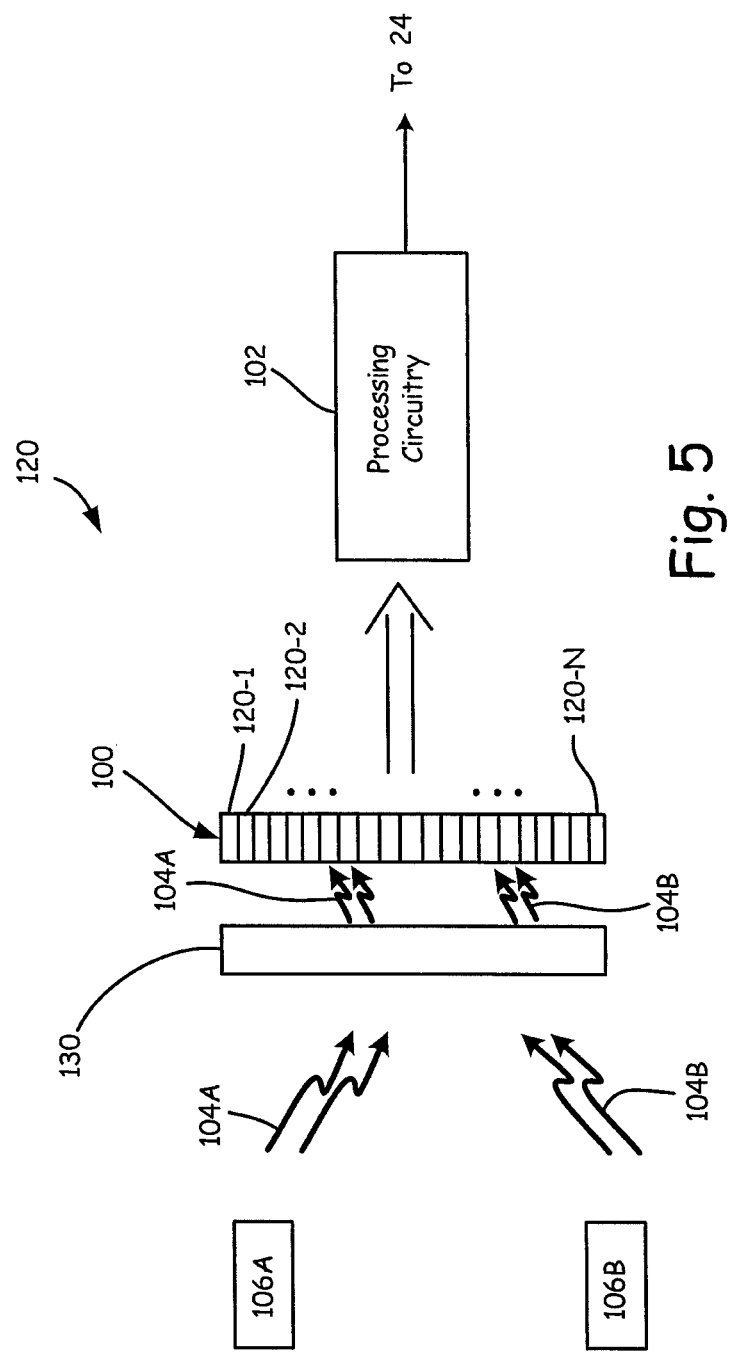
FIG. 5 is a simplified schematic diagram illustrating another example configuration of an infrared for use with the field device shown in FIG. 2.

FIG. 5 is a simplified block diagram of another example implementation of infrared detector 100. In the embodiment of FIG. 5, infrared detector 100 is formed by an array of infrared sensors 120-1 . . . 120-N. This array may, for example, be a one-dimensional linear array. In another configuration, detector 100 is a two-dimensional matrix, for example, as found in a thermal imaging system. One example thermal imaging system is available from Optrix PI-160 thermal imaging camera. As illustrated in FIG. 5, heat radiation 104A,104B from sources 106A,106B, respectively, are directed to different locations on sensor 100 whereby different detectors 120 are activated. Processing circuitry 102 receives information related to the intensity of the thermal radiation received by each of the detectors 120. In one configuration, each of the detectors 120 simply provides an output if the thermal radiation it receives exceeds a threshold. In another embodiment, the output from each of the detectors 120 is indicative of the strength of the received infrared radiation. This information is provided to the microprocessor 24 through processing circuitry 102 which comprises an analog to digital converter. Based upon this information, the microprocessor 24 can identify a location of a thermal anomaly. A diagnostic condition can be identified by the microprocessor 24 by comparing the outputs of one or more detectors 120 directed at a first location with the outputs of one or more detectors 120 directed at a second location. Based upon this comparison, a diagnostic condition can be determined, such as for example, escaping gas. The output from the sensors 120 can be weighted using a weighting function which may or may not be linear as desired. Similarly, the weighting function may be based upon other inputs including information from other infrared detectors, process variable information, process command information, temperature measurements, time or date information, etc.

Figure 6:
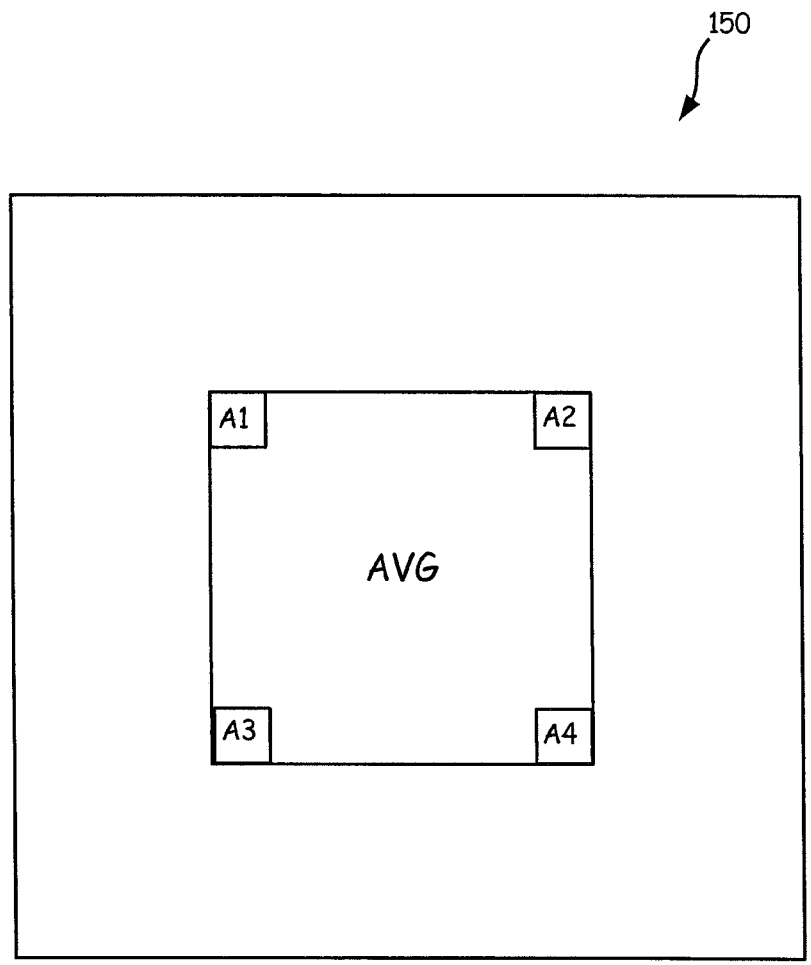
FIG. 6 is an example view of a thermal image generated using a thermal detector of the present invention.

FIG. 6 shows an image 150 generated using a two-dimensional sensor array such as that shown in FIG. 5. In FIG. 6, four separate areas A1, A2, A3 and A4 are illustrated. Further, a larger area identified as Avg is illustrated. For example, one of the regions A1-4 may correspond to the region proximate leak 32 shown in FIG. 1 whereas another of the areas may correspond to some other region in the industrial process 10, for example, where there is no gas leak. The microprocessor 24 can calculate the average values output by the individual sensors within regions A1, A2, A3, A4 and Avg. Based upon these averages, the temperature differentials $\Delta T1$, $\Delta T2$, $\Delta T3$, and $\Delta T4$ can be calculated as follows:

$$\Delta T1 = A1 - A2 \qquad \text{Equation 1}$$

$$\Delta T2 = A3 - A4 \qquad \text{Equation 2}$$

$$\Delta T3 = A1 - A4 \qquad \text{Equation 3}$$

$$\Delta T4 = A2 - A3 \qquad \text{Equation 4}$$

Based upon these temperature differentials, the maximum deviations $\Delta T$ can be calculated in accordance with Equation 5:

$$\text{MaxDev}\_\Delta T = \text{Maximum}(\text{Stdev}(\Delta T1), \text{Stdev}(\Delta T2), \text{Stdev}(\Delta T3), \text{Stdev}(\Delta T4)) \qquad \text{Equation 5}$$

Figure 7:
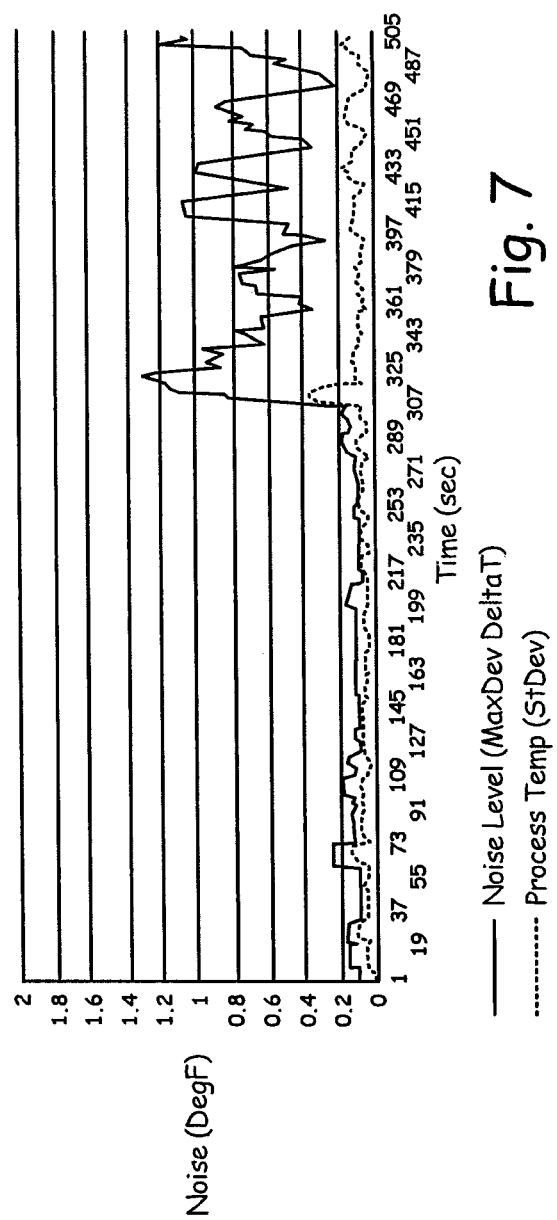
FIG. 7 is a graph showing noise versus time which illustrates the occurrence of a diagnostic condition.

By monitoring the value of the MaxDev_$\Delta T$ thermal events can be identified. For example, FIG. 7 is a graph of noise (degrees Fahrenheit) versus time illustrating the standard deviation of the process temperature in the region labeled Avg in FIG. 6, along with the MaxDev_$\Delta T$ in accordance with Equation 5. At a time of about 300 seconds in FIG. 7, a steam leak occurs in the image 150. This causes a large variation in the MaxDev_$\Delta T$ calculation as illustrated in FIG. 7. The microprocessor 24 can use this change to detect the occurrence of a diagnostic condition.

Although the above description is related to comparison of temperatures in two areas at a time, any number of areas may be used to detect temperature variations. Further, the individual temperatures, including temperature averages within areas, as well as outputs from individual sensors (i.e., "pixels") can be weighted, averaged, or otherwise combined as desired. Further, there can be a time difference between when the various pixels are obtained.

In one example configuration, information related to the outputs from each of the individual sensors 120 can be transmitted back to a central location such as control room 16 shown in FIG. 1. In another example embodiment, a reduced information set is transmitted back to the control room 16. For example, such limited information sets include average temperature values of particular areas, only information from areas of interest or selected areas, information related to comparison of temperature levels to threshold, etc. In one example configuration, element 19 shown in control room 16 of FIG. 1 comprises a display for viewing by an operator. Images may be stored in a memory associated with display 19 whereby upon detection of a diagnostic condition, the display 19 can display an image associated with a location of where the condition was detected. Further, the region within the image can be identified on the display 19 based upon information provided by device 12 over process control loop 18. This allows an operator to obtain a visualization of the problem area, without requiring an image to be transmitted from the device 12 over a process control loop 18 which may have limited bandwidth capabilities.

The infrared detector 100 and/or processing circuitry 102 may be located remotely from the device 12 and communicate over a data connection. The data connection may be any appropriate type of connection including wired techniques, for example, a USB connection, as well as wireless communication techniques including WirelessHART®, BlueTooth®, etc. Further, the infrared detector 100 and/or processing circuitry 102 may be affixed to the housing of device 12 or formed integrally with the housing of device 12. In one configuration, the direction of the infrared detector 100 can be adjusted by an operator during installation to point at a desired location. In another example embodiment, pan and/or tilt actuators are provided allowing the infrared detector 100 to be moved during operation. In one configuration, a hand-held device or the like is used during installation whereby a thermal output from the detector 100 may be observed by the installation personnel to ensure that the infrared detector 100 is pointed as desired.

Although the present invention has been described with reference to preferred embodiments, workers skilled in the art will recognize that changes may be made in form and detail without departing from the spirit and scope of the invention. The comparator discussed herein comprises one type of analog to digital conversion circuitry. As used herein, the term "subsection" or "region" refers to something less than an entire image. Typically, a subsection or region corresponds to a particular location within the industrial process. A thermal image may be obtained using a stationary infrared sensor, or may be obtained by movement of the infrared sensor between one or more subsections or regions. In another example, a lensing mechanism is used to obtain a thermal image from more than one subsection or region. The identification of a diagnostic condition can be based upon a simple comparison between regions, a relationship in a sensor output from different subsections or regions, etc. A simple comparison and a threshold may be used, or more complex configurations including, for example, neural networks or other logic may be implemented. Additionally, the diagnostic condition determination can be based upon some additional input such as a process variable. Further, the determination can be based upon a comparison of a relationship between more than two subsections of the thermal image. Any number of subsections may be monitored. The diagnostic condition determination can further be a function of the current time, sensed process variables, the particular state a process is in, etc. Statistical relationships between multiple subsections can be monitored as can trends. The diagnostic circuitry described herein can be implemented in hardware or software and includes both analog and digital implementations. For example, one or both of the processing circuitry 102 and the microprocessor 24 may implement the diagnostic circuitry. In another example embodiment, the thermal image information is transmitted to another location at which the diagnostic circuitry resides.

What is claimed is:

1. A method of performing diagnostics with a field device and responsively identifying a diagnostic condition in an industrial process, comprising:
    sensing infrared emissions from a location in the industrial process using an infrared sensor array comprising a plurality of infrared sensors;
    determining average value outputs from a plurality of areas of the sensor array comprising at least an area average A1, an area average A2, an area average A3 and an area average A4, wherein each of the plurality of areas comprises a plurality of infrared sensors in the infrared sensor array;

comparing the average output A1 from a first area of the sensor array with the average output A2 from a second area of the sensor array and determining a maximum temperature deviation based upon a difference obtained by the comparing of the average outputs to thereby reduce the effect of noise in the sensed infrared emissions and determining a temperature differential ΔT1 based upon the formula:

$$\Delta T1 = A1 - A2;$$

comparing the average output A3 from a third area of the sensor array with the average output A4 from a fourth area of the sensor array and determining a maximum temperature deviation based upon a difference obtained by the comparing of the average outputs to thereby reduce the effect of noise in the sensed infrared emissions and determining a temperature differential ΔT2 based upon the formula:

$$\Delta T2 = A3 - A4;$$

comparing the average output A1 from the first area of the sensor array with the average output A4 from the fourth area of the sensor array and determining a maximum temperature deviation based upon a difference obtained by the comparing of the average outputs to thereby reduce the effect of noise in the sensed infrared emissions and determining a temperature differential ΔT3 based upon the formula:

$$\Delta T3 = A1 - A4;$$

comparing the average output A2 from the second area of the sensor array with the average output A3 from the third area of the sensor array and determining a maximum temperature deviation based upon a difference obtained by the comparing of the average outputs to thereby reduce the effect of noise in the sensed infrared emissions and determining a temperature differential ΔT4 based upon the formula:

$$\Delta T4 = A2 - A3; \text{ and}$$

responsively providing a diagnostic output indicative of a diagnostic condition based upon the maximum temperature deviations.

2. The method of claim 1 wherein the plurality of infrared sensors comprises a plurality of transistors which are responsive to infrared radiation.

3. The method of claim 1 wherein the infrared sensor array is arranged to detect a thermal image.

4. The method of claim 1 wherein the diagnostic output is further a function of a sensed process variable.

5. The method of claim 1 including transmitting information related to a thermal image sensed by the infrared sensor array to a control room.

* * * * *